United States Patent
Yoo et al.

(10) Patent No.: US 9,792,072 B2
(45) Date of Patent: Oct. 17, 2017

(54) EMBEDDED MULTIMEDIA CARD (EMMC), HOST CONTROLLING EMMC, AND METHOD OPERATING EMMC SYSTEM

(71) Applicant: SAMSUNG ELECTRONICS CO., LTD., Suwon-si, Gyeonggi-Do (KR)

(72) Inventors: Kyung Phil Yoo, Seoul (KR); Sung Ho Seo, Seoul (KR); Myung Sub Shin, Suwon-si (KR); Woon Jae Chung, Gunpo-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 94 days.

(21) Appl. No.: 14/024,786

(22) Filed: Sep. 12, 2013

(65) Prior Publication Data

US 2014/0082267 A1    Mar. 20, 2014

(30) Foreign Application Priority Data

Sep. 14, 2012  (KR) .......................... 10-2012-0102483

(51) Int. Cl.
*G06F 3/06* (2006.01)
*G06F 12/02* (2006.01)

(52) U.S. Cl.
CPC ............ *G06F 3/0659* (2013.01); *G06F 3/061* (2013.01); *G06F 3/0656* (2013.01); *G06F 3/0679* (2013.01); *G06F 12/0246* (2013.01)

(58) Field of Classification Search
None
See application file for complete search history.

(56) References Cited

U.S. PATENT DOCUMENTS

| | | | | |
|---|---|---|---|---|
| 6,081,860 A * | 6/2000 | Bridges | ................. | G06F 13/364 710/107 |
| 6,323,867 B1 * | 11/2001 | Nookala et al. | .............. | 345/522 |
| 6,496,192 B1 * | 12/2002 | Shreesha et al. | ............. | 345/540 |
| 6,715,096 B2 * | 3/2004 | Kuge | ............................ | 713/600 |
| 6,785,793 B2 | 8/2004 | Aboulemein et al. | | |
| 2003/0088717 A1 * | 5/2003 | Baas | ..................... | G06F 13/364 710/1 |
| 2003/0167376 A1 * | 9/2003 | Koh | ................. | G06K 19/07732 711/115 |

(Continued)

FOREIGN PATENT DOCUMENTS

| | | |
|---|---|---|
| CN | 101241752 A | 8/2008 |
| CN | 102027455 A | 4/2011 |

(Continued)

OTHER PUBLICATIONS

Chinese Office Action in Related Chinese Application No. 201310421543.6 dated Jul. 12, 2017.

*Primary Examiner* — Sean D Rossiter
*Assistant Examiner* — Charles Choi
(74) *Attorney, Agent, or Firm* — Volentine & Whitt, PLLC

(57) ABSTRACT

An embedded multimedia card (eMMC) includes a flash memory and an eMMC controller that controls operation of the flash memory. The eMMC controller includes a command register that receives from a host a command set defining a next operation specifying second data simultaneously with a transfer of first data specified by a current operation, a first memory that stores the first data, and a second memory that stores the second data.

14 Claims, 10 Drawing Sheets

(56) References Cited

U.S. PATENT DOCUMENTS

| | | | |
|---|---|---|---|
| 2003/0202383 A1* | 10/2003 | Shiota | G06F 13/161 365/185.33 |
| 2005/0080842 A1* | 4/2005 | Takeuchi | G06F 13/385 709/200 |
| 2006/0069869 A1* | 3/2006 | Lakshmanamurthy et al. | 711/118 |
| 2009/0094678 A1* | 4/2009 | Floman et al. | 726/2 |
| 2010/0287333 A1 | 11/2010 | Lee et al. | |
| 2011/0072193 A1 | 3/2011 | Yeh | |
| 2011/0078393 A1 | 3/2011 | Lin | |
| 2011/0208905 A1* | 8/2011 | Shaeffer et al. | 711/103 |
| 2011/0296131 A1 | 12/2011 | Yim et al. | |
| 2012/0102262 A1 | 4/2012 | Nango et al. | |
| 2012/0124272 A1* | 5/2012 | Hsiao et al. | 711/103 |
| 2013/0019053 A1* | 1/2013 | Somanache et al. | 711/103 |
| 2013/0205105 A1* | 8/2013 | Nakata | G06F 13/28 711/154 |

FOREIGN PATENT DOCUMENTS

| | | |
|---|---|---|
| CN | 102082798 A | 6/2011 |
| CN | 102883471 A | 9/2012 |
| JP | 2003122702 | 4/2003 |
| KR | 20100064562 A | 6/2010 |
| KR | 20100064673 A | 6/2010 |

\* cited by examiner

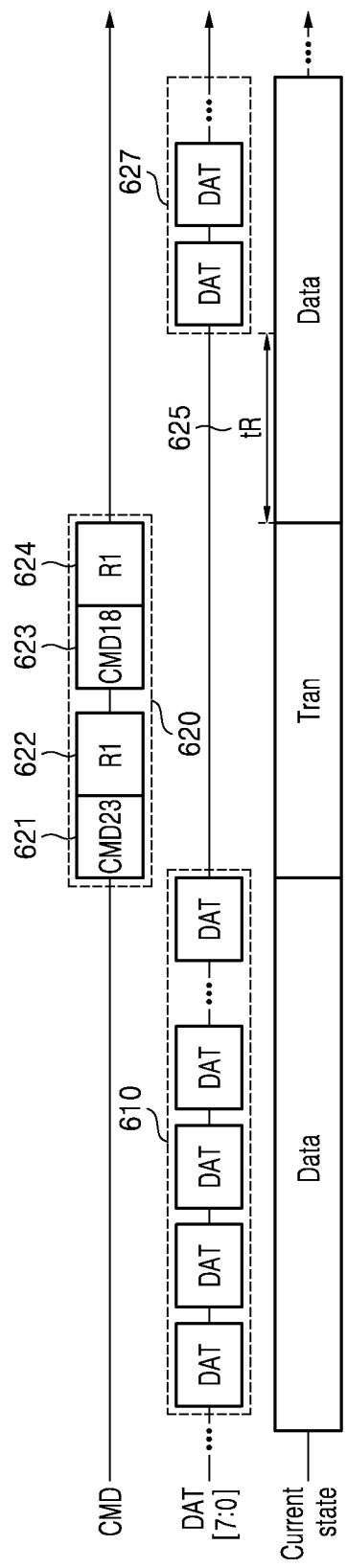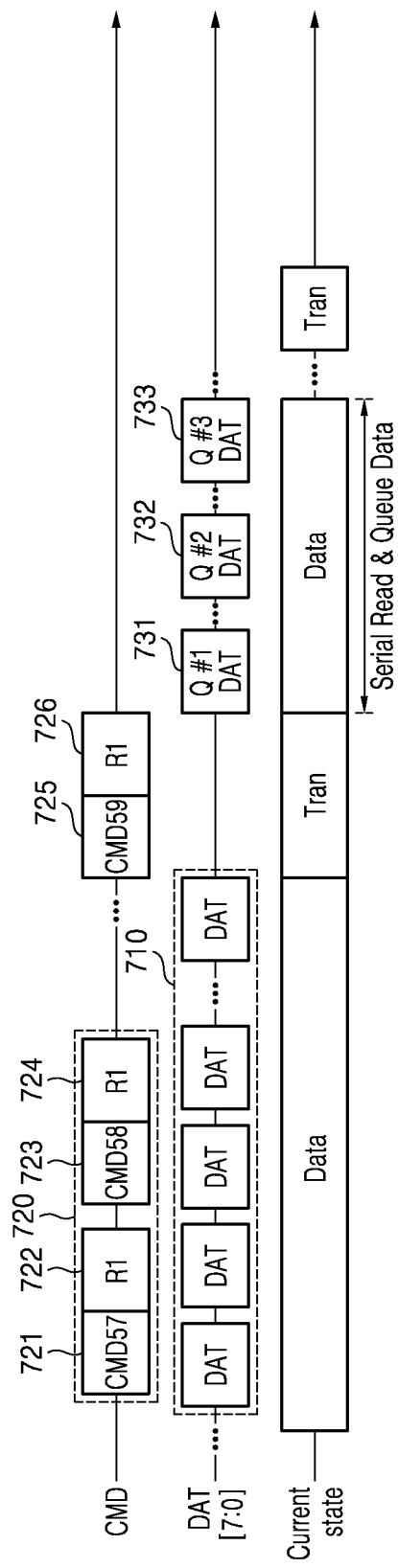

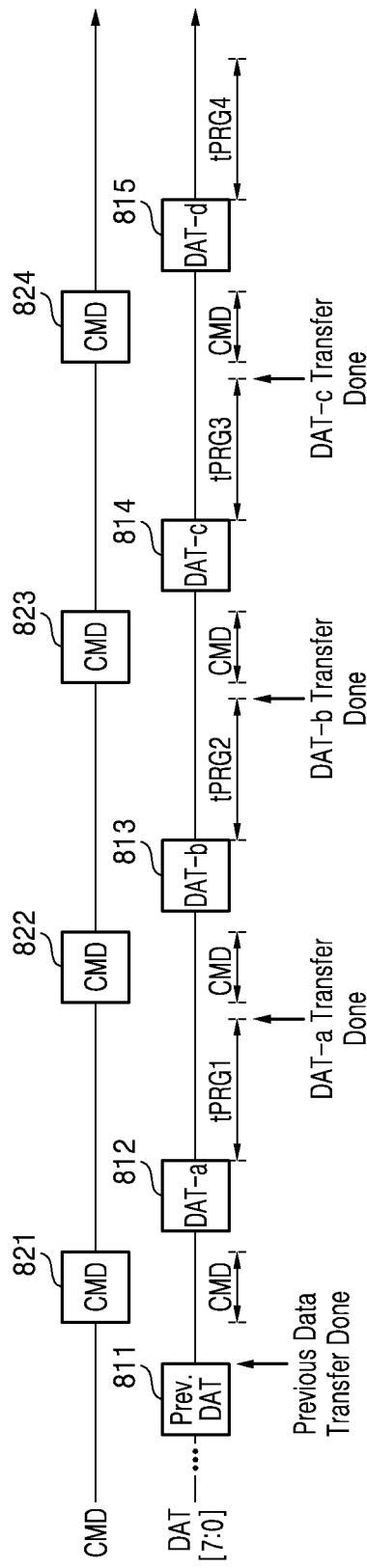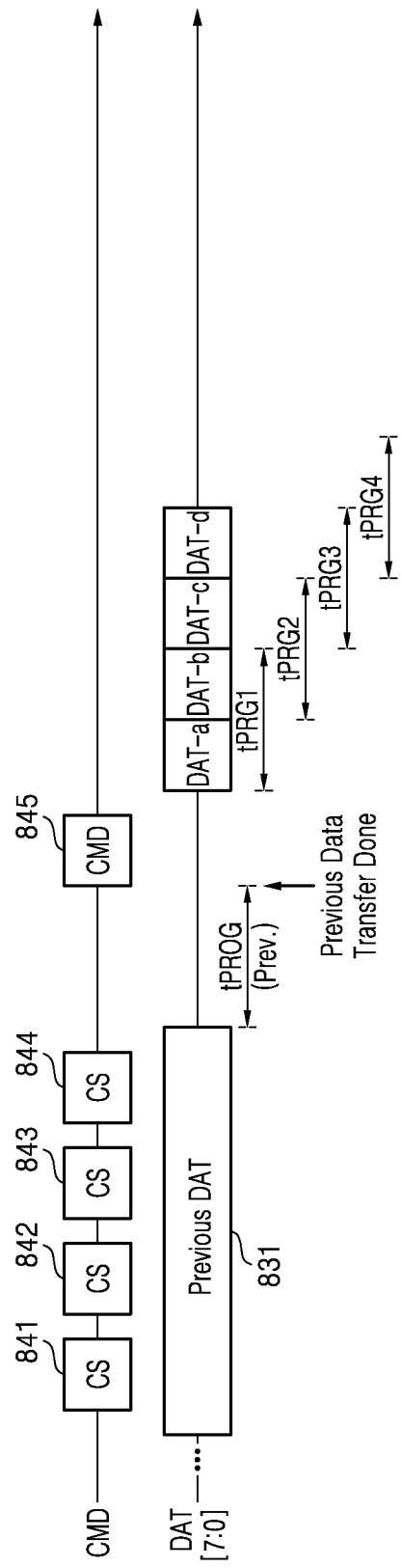

EMBEDDED MULTIMEDIA CARD (EMMC), HOST CONTROLLING EMMC, AND METHOD OPERATING EMMC SYSTEM

CROSS-REFERENCE TO RELATED APPLICATIONS

This application claims priority under 35 U.S.C. §119(a) from Korean Patent Application No. 10-2012-0102483 filed on Sep. 14, 2012, the subject matter of which is hereby incorporated by reference.

BACKGROUND

The inventive concept relates generally to embedded multimedia card(s) (eMMC), hosts controlling eMMC and methods of operating eMMC systems including a host and eMMC. More particularly, the inventive concept relates to eMMC, eMMC systems and operating methods providing improved read/write performance.

The so-called multimedia card (MMC) is a particular type of flash memory card defined in accordance with applicable standard(s). The eMMC is an embedded MMC standard defined by a set of standards administered by the Joint Electron Devices Engineering Council (JEDEC). In general configuration and application eMMCs are designed to be inserted (or "embedded") in conjunction with a host within mobile communication devices such as smart phones. Conventionally, the eMMC communicates data signals, control signals, commands, clock(s) and/or power signals with a connected host via a standardize 10-line bus.

SUMMARY

According to certain embodiments of the inventive concept, there is provided an embedded multimedia card (eMMC) including a flash memory and an eMMC controller that controls operation of the flash memory. The eMMC controller includes a command register that receives from a host a command set defining a next operation specifying second data simultaneously with a transfer of first data specified by a current operation, a first memory that stores the first data, and a second memory that stores the second data.

According to certain embodiments of the inventive concept, there is provided a method of operating an embedded multimedia card (eMMC) including flash memory, the eMMC being connected to a host via a command line and a data bus, the method including; transferring first data stored in a first memory of the eMMC to the host via the data bus in response to a current command, and simultaneously with the transfer of first data, communicating a command set defining a next operation specifying second data from the host to the eMMC via the command line and storing the command set in a command register in the eMMC.

According to certain embodiments of the inventive concept, there is provided a method of operating an embedded multimedia card (eMMC) including flash memory, the eMMC being connected to a host via a command line and a data bus, the method including; using two normal read/write operations to sequentially execute a first read/write operation and then a second read/write operation in series, wherein each normal read/write operation causes a transfer of data as stored in the flash memory; else using a single multi-queue read/write operation to execute the first read/write operation simultaneously with the second read/write operation, wherein the multi-queue/write operation causes a transfer of data as stored in the flash memory.

BRIEF DESCRIPTION OF THE DRAWINGS

Features and advantages of the inventive concept along with its making and use may be readily understood by those skilled in the art upon consideration of certain exemplary embodiments described hereafter in conjunction with the accompanying drawings in which:

FIG. 8, inclusive of FIGS. 8A and 8B, is a set of operating diagrams comparing a nominal read operation that may be performed by an eMMC with a multi-queue read operation that may be performed by an eMMC according to embodiments of the inventive concept;

FIG. 10, inclusive of FIGS. 10A and 108B, is a set of operating diagrams comparing a nominal read operation that may be performed by an eMMC with a multi-queue read operation that may be performed by an eMMC according to embodiments of the inventive concept.

DETAILED DESCRIPTION

Figure 1:
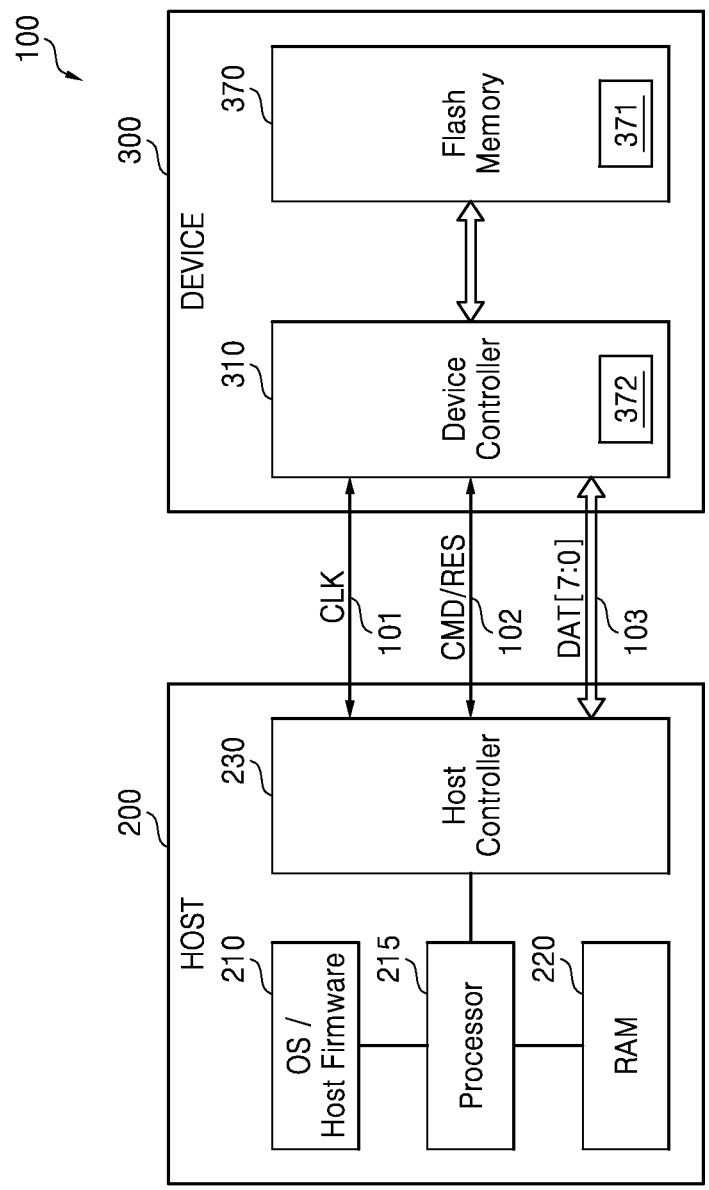
FIG. 1 is a block diagram of an embedded multimedia card (eMMC) system according to certain embodiments of the inventive concept.

Certain embodiments of the inventive concept will now be described in some additional detail with reference to the accompanying drawings. This inventive concept may, however, be embodied in many different forms and should not be construed as limited to only the illustrated embodiments. Rather, these embodiments are provided so that this disclosure will be thorough and complete, and will fully convey the scope of the inventive concept to those skilled in the art. Throughout the written description and drawings, like reference numbers and labels will be used to refer to like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or"

includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Those skilled in the art will understand that various JEDEC standards are available that characterize and/or define the structure, constitution and/or operating conditions of eMMCs. These standards may be readily obtained and consulted by recourse to http://www.jedec.org. For example, the embedded multimedia card (eMMC) electrical standard, version 4.51 published Jun. 2012 (i.e., JESD84-B451) contains many terms and technical definitions that are useful to an understanding of the inventive concept.

Various embodiments of the inventive concept may include one or more signal line(s) or signal bus, along with corresponding communication channel(s), that are additional to the standard 10-wire bus defined by JEDEC eMMC standards. In this regard, pending U.S. Patent Application [U.S. Attorney Docket No. SEC.3341 claiming priority to Korean Patent Application No. 10-2012-0102467 filed on Sep. 14, 2012] is hereby incorporated by reference.

Figure (FIG.) 1 is a block diagram of an eMMC system 100 according to certain embodiments of the inventive concept. The eMMC system 100 includes a host 200 connected to a "device" (e.g., an eMMC) 300. The host 200 may be used to control data processing operations (e.g., read/write operations) performed by the eMMC 300. Such data processing operations may be performed using a single data rate (SDR) or a double data rate (DDR).

The host 200 may be one of a number of different data processing device(s), such as a central processing unit (CPU), a processor, a microprocessor, or an application processor, which can process data. The host 200 and/or eMMC 300 may be embedded or implemented in an electronic device. The electronic device may be implemented as a personal computer (PC), a laptop computer, a mobile telephone, a smart phone, a tablet PC, a personal digital assistant (PDA), an enterprise digital assistant (EDA), a digital still camera, a digital video camera, an audio device, a portable multimedia player (PMP), a personal navigation device or portable navigation device (PND), an MP3 player, a handheld game console, or an e-book.

As will be appreciated by those skilled in the art, the eMMC 300 may be variously connected with the electronic device via a number of connections, channels or signal paths implemented by one or more of conventional components including (e.g.,) pad(s), pin(s), line(s), and bus(es)

The host 200 illustrated in FIG. 1 generally includes a processor 215, a memory (RAM) 220 and a host controller 230. Additionally, a host-resident operating system (OS) or firmware 210 may be used by the processor 215 to drive data/address/command/control signals to the eMMC 300. The host 200, and in certain embodiments the host controller 230 of the host 200, may include a clock generator (not shown) and/or a state control unit (not shown). The clock generator may be used to generate a "clock" signal CLK used as a reference signal in the host 200 and/or the eMMC 300. For example, those skilled in the art will understand how a competent clock generator may be implemented using a phase locked loop (PLL) circuit.

In certain embodiments of the inventive concept, the processor 215 may be hardware component that controls generation of a command CMD communicated to the eMMC 300. The processor 215 may also be used to analyze a response RES received from the eMMC 300 in response to a command. The processor 215 may also be used to process data stored in an extended card specific data (CSD) register (or an EXT_CSD register) 371 of the eMMC 300. The processor 215 may also be used to process of data received from the eMMC 300 and/or other data. In each of these general functions, the processor 215 may use the OS/host firmware 210.

The host controller 230 interfaces with the eMMC 300, and thus the host controller 230 may be used to communicate the command CMD to the eMMC 300, receive the response RES from the eMMC 300, transmit "write data" to be written to the eMMC 300, and receive "read data" retrieved from the eMMC 300.

The standard ten (10) eMMC signal lines 101, 102 and data bus 103 illustrated in FIG. 1 are consistent with applicable industry standards (e.g., the JEDEC defined eMMC 4.51). However, as previously noted, the scope of the inventive concept is not restricted to only standard signal line/bus configurations between a host and eMMC.

In the standard signal line/bus configuration of FIG. 1, a bidirectional clock line 101 may be used to communicate a clock signal CLK from the host 200 to the eMMC 300. A bidirectional command line 102 may be used to communicate a command CMD from the host 200 to the eMMC 300, and to communicate a response RES to the command CMD from the eMMC 300 to the host 200. And a bidirectional data bus 103, including eight (8) data signal lines [0:7], may be used to communicate write data from the host 200 to the eMMC 300 during a write operation, or to communicate read data from the eMMC 300 to the host 200 during a read operation.

In certain embodiments of the inventive concept, the host 200 may communicate a hardware reset signal to the eMMC 300 via a reset line (not shown). One or more voltage generating circuits (not shown) in the host 200 may be used to provide one or more operating voltages to the eMMC 300. Such host-generated operating voltages may be communicated to the eMMC 300 via one or more voltage lines (not shown).

Figure 2:
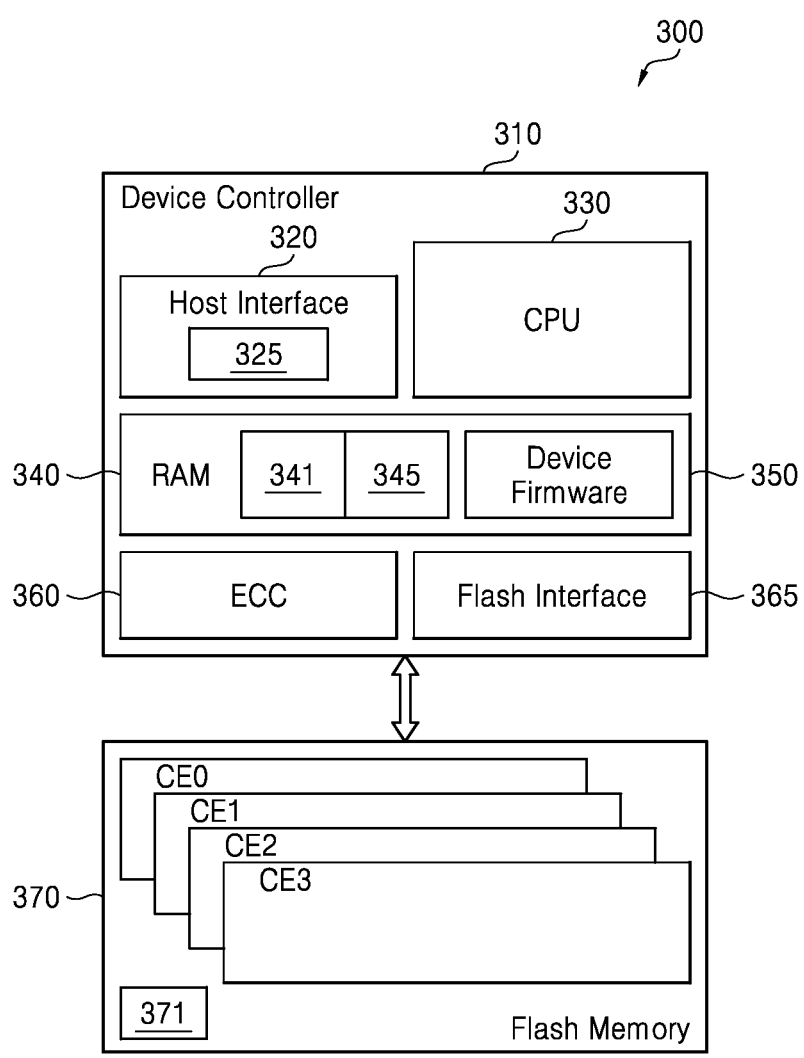
FIG. 2 is a block diagram further illustrating the eMMC of FIG. 1.

FIG. 2 is a block diagram further illustrating in one example the eMMC 300 of FIG. 1 according to certain embodiments of the inventive concept. Here, the eMMC 300 generally includes a device (eMMC) controller 310 and a flash memory 370.

The eMMC controller 310 controls the exchange of read data and write data between the host 200 and flash memory 370. The eMMC controller 310 illustrated in FIG. 1 includes an eMMC host interface 320, a CPU 330, a memory 340, an error correction code (ECC) block 360, and a flash interface 365.

The eMMC host interface 320 upon receiving the clock signal CLK and a command CMD from the host 200, analyzes the command CMD, generates an appropriate response RES, and communicates the response RES—along with read data, as necessary to the host 200. The eMMC host interface 320 of FIG. 2 includes a command register 325 that may be used to implement a multi-queue read operation and/or a multi-queue write operation. These operations will be described hereafter.

Figure 3:
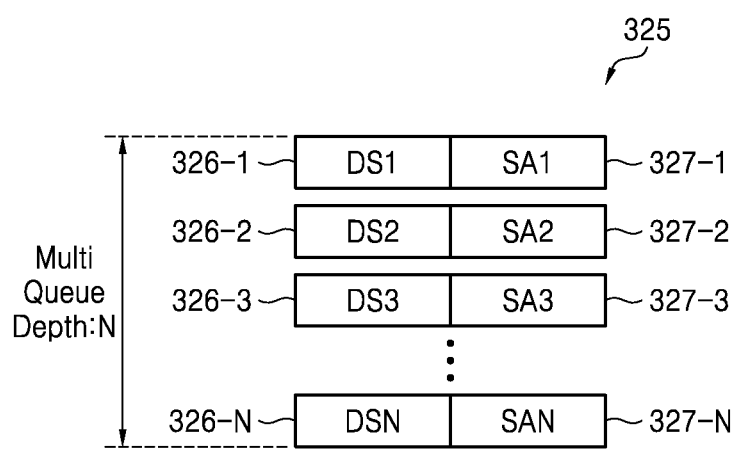
FIG. 3 is a conceptual diagram illustrating one possible example of a command register that may be used in the conjunction with the eMMC of FIG. 2.

FIG. 3 is a conceptual diagram illustrating one possible example of a command register that may be used in the conjunction with the eMMC of FIG. 2. The command register 325 of FIG. 3 includes a number "N" of register sets (or command register sets), where N is an integer greater than 1. Hence, this number N may be used to define a "depth" (or queue size) for the multi-queue register 325.

Referring now to FIGS. 2 and 3, the eMMC host interface 320 may receive a multi-queue command from the host 200 that indicates a maximum multi-queue depth for the command register 325. The eMMC host interface may then store the received multi-queue command in the register sets of the command register 325. The command register 325 of FIG. 3 includes "data size registers" 326-1 through 326-N respectively storing data sizes DS1 through DSN, and corresponding "address registers" 327-1 through 327-N respectively storing start addresses SA1 through SAN. The data sizes DS1 through DSN and corresponding the start addresses SA1 through SAN are examples of the type of information that may be included in a multi-queue command received by the host interface 320 from the host 200.

In certain ways, a multi-queue command may be understood as a command that is predefined between the host 200 and eMMC 300. That is, the communication of a multi-queue command from the host 200 to the eMMC 300 is a way of "looking forward" to a "next command" to be performed by the eMMC 300 once the "current command" being performed by the eMMC 300 has been completed. Thus, a next command (the multi-queue command) may be stored in a command execution queue of the eMMC 300 during at least part of the time period during which a current command is being executed.

A multi-queue command may define a "read command" that retrieves read data from the eMMC 300, or a "write command" that causes write data to the written to the eMMC 300. A multi-queue command may define a "data read-out command" that causes retrieved read data to be communicated to the host 200 from the eMMC 300, and a "data write-in command" that store write data buffer memory associated with the flash memory 370. However, these are just ready example of certain multi-queue commands that may be used by embodiments of the inventive concept.

Figure 4A:
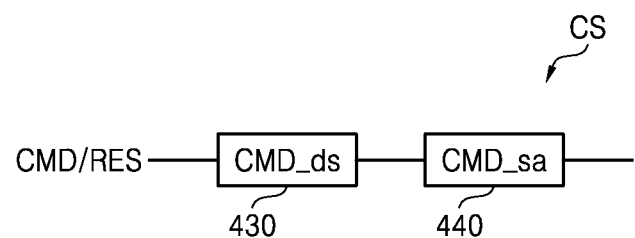
FIG. 4, inclusive of FIGS. 4A, 4B and 4C, conceptually illustrates certain exemplary multi-queue commands as well as information associated with same.
Figure 4B:
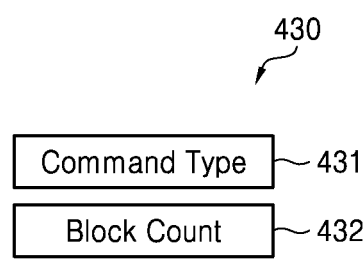
Figure 4C:
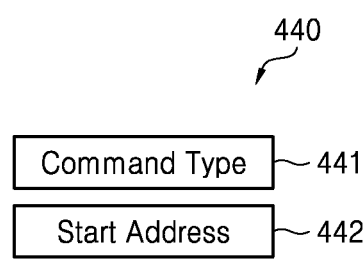

FIG. 4, inclusive of FIGS. 4A, 4B and 4C, conceptually illustrates certain exemplary multi-queue commands as well as information associated with same.

Referring to FIG. 4A, a multi-queue command may implemented as a "command set" CS including at least one command register entry, each having one or more parts (e.g., CMD_ds and CMD_sa). Here, the first part of the command register entry (CMD_ds 430) is a "size command" used to specify the size of either read data to be retrieved from the flash memory 370, or the size of write data to be written to flash memory 370. The second part of the command register entry (command CMD_sa 440) is an "address command" used to specify a start address for the read data or write data. In the illustrated embodiment of FIG. 4A, the size command CMD_ds may be first issued, followed by the address command CMD_sa. However, this issuing order may be reversed.

Referring to FIG. 4B, the size command 430 in at least one embodiment may include a command type 431 and a data size value (e.g., a block count) 432. In this context, a block is a given data unit of predetermined size and may correspond, for instance, to the size of a data page in the flash memory 370. Consistent with the embodiment of FIG. 3, the data size 432 of FIG. 4 may be stored in one of the data size registers 326-1 through 326-N in the register set 325.

Referring to FIG. 4C, the address command 440 in at least one embodiment may include a command type 441 and a start address value 442. The start address value 442 of the address command 440 may be stored in one of the corresponding address registers 327-1 through 327-N in the register set 325. However, in other embodiments of the inventive concept, the data size value 432 and the start address value 442 may be included in a single command communicated to the eMMC 300.

Referring back to FIG. 3, a "data size" DS and a "start address" SA may be included in a multi-queue command issued from the host 200 and communicated to the eMMC 300. The start address SA indicates a start position for data identified by the multi-queue command, and the data size DS indicates the size of said data. For instance, when the multi-queue command is a read command, the start address SA may be indicated as "100", and the data size DS may be indicted as "10". Thus, the constituent read command will cause the eMMC 300 to retrieve 10 data blocks of read data beginning at the start address in flash memory 370 of 100.

Referring back to FIG. 2, the CPU 330 may be used to control the operations of the host interface 320 and the flash interface 365, as well as to control the overall operation of the eMMC 300. The memory 340 may be used to temporarily store write data and/or read data being communicated between the host interface 320 and flash interface 365. The memory 340 may be implemented by non-volatile memory. In the illustrated embodiment of FIG. 2, the memory 340 includes memory portions designated as a normal buffer 341, a queue data buffer 345, and device firmware 350. The device firmware 350 portion may be used to store programming code executed by the CPU 330.

The ECC block 360 of FIG. 2 may be used to detect and/or correct errors in read data provided by the flash memory 370.

The flash memory 370 of FIG. 3 may be used to receive and store, erase, and/or retrieve and provide data in response to various commands. When the flash memory 370 is implemented by NAND flash memory, for example, the flash interface 365 may be implemented by a NAND flash interface. In certain embodiments, the flash memory 370 may include the so-called, and conventionally understood, EXT_CSD register 371 that may be used to store device properties and selectable operating modes for the flash memory 370.

The eMMC 300 may additionally or alternately include a host control register 372 (FIG. 1) in addition to the EXT_CSD register 371, where the host control register is a register disposed in the eMMC 300 other than the EXT_CSD register 371 that may be controlled or have its data contents set by the host 200.

In the illustrated embodiment of FIG. 2, the flash memory 370 includes a plurality of memory elements CE0 through CE3. Although four (4) memory elements CE0 through CE3 are illustrated in FIG. 2, the inventive concept is not restricted to this number. The flash memory 370 may be configured to operate using two or more channels.

The host 200 may issue a SEND_EXT_CSD command (=CMD8) to read the EXT_CSD register 371. In response, the eMMC 300 will communicate as a block (e.g., 512 bytes in length) the data stored by of the EXT_CSD register 371. Information indicating the depth "N" of the command register 325 (or multi-queue depth) may be included in a reserved field of the EXT_CSD register 371. Alternatively, information defining the multi-queue depth may be provided by the host control register 371 in the eMMC 300.

Figure 5:
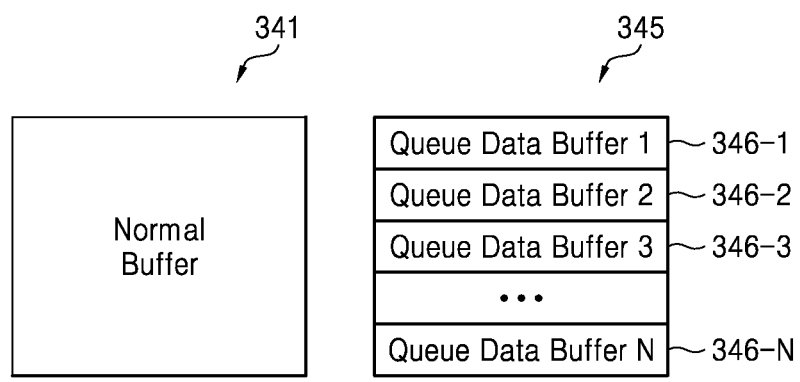
FIG. 5 is a block diagram further illustrating of the constituent buffers 341 and 345 in the memory 340 of FIG. 2 according to certain embodiments of the inventive concept.

FIG. 5 is a block diagram further illustrating of constituent buffers 341 and 345 in the memory 340 of FIG. 2 according to certain embodiments of the inventive concept. The normal buffer 341 and queue data buffer 345 may be respectively used to temporarily store write data that has been received from the host 200 and is to be written to the flash memory 370, or read data that has been retrieved from the flash memory 370 and is to be returned the host 200.

The normal buffer 341 will be used during normal read/write operations, wherein a "normal" read/write operation is any read/write operation specified by the host 200 other than a multi-queue read/write operation. In contrast, the queue data buffer 345 will be used during a multi-queue read/write operation. However, according to an operating method and/or eMMC system necessity and available resources, the normal buffer 341 may be used as part of the queue data buffer 345, and/or the queue data buffer 345 may be used as part of the normal buffer 341.

Designated sections of a single memory 340 in the device controller 310 may be used for the normal buffer 341 and queue data 345. Alternatively, separate memories or a portion of a general buffer memory or scratch pad memory may be used for the normal buffer 341 and queue data 345. These memory elements maybe provided internal or external to the device controller 310.

The normal buffer 341 will usually be used to store data in response to a "normal command" indicating a normal read/write command, whereas the queue data buffer 345 will usually be used to store data in response to a "multi-queue command" indicating a multi-queue operation according to an embodiment of the inventive concept. In certain embodiments of the inventive concept, the size of the queue data buffer 345 will be equal to the multi-queue depth N.

As described above, when the queue data buffer 345 is provided separately from the normal buffer 341, data corresponding to a multi-queue command may be stored in the queue data buffer 345 "simultaneously with" (i.e., during execution time periods for the respective commands are executed at least partially in an overlapping manner) data being stored in the normal buffer 341.

Figure 6:
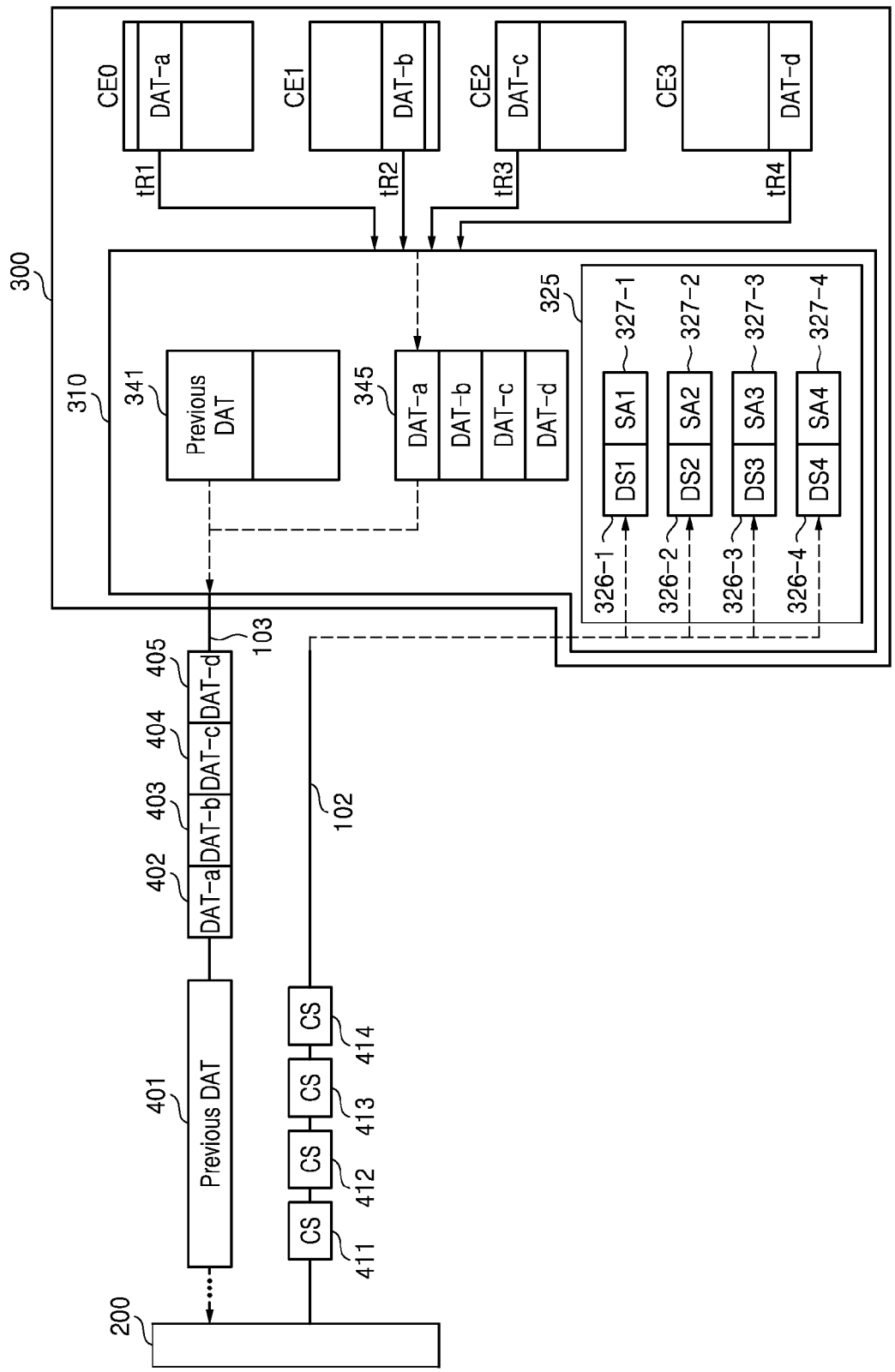
FIG. 6 is a conceptual diagram illustrating one possible approach to a multi-queue read operation that may be performed of the eMMC system of FIG. 1 according to certain embodiments of the inventive concept.

FIG. 6 is a conceptual diagram illustrating one possible approach to a multi-queue read operation that may be performed of the eMMC system of FIG. 1 according to certain embodiments of the inventive concept. Referring collectively to FIGS. 1, 2, 3, 4, 5 and 6, the host 200 is assumed to transfer a command set including command set register entries 411, 412, 413 and 414 to the eMMC 300 via command line 102 simultaneously with the transfer of read data 401 specified by a "current command" (i.e., a command currently being executed) via the data bus 103. In this manner, a command queue for the eMMC 300 may be efficiently loaded (or pre-loaded) with one or more "next commands" (i.e., one or more command to be sequentially executed following completion of the current command execution) while data 401 associated with a current command is being communicated via the data bus 103.

The maximum number of command register entries for a multi-queue command set CS that the host 200 may send to the eMMC 300 is defined by the multi-queue depth N. Assuming the structure of a command register entry described in relation to FIG. 4, each one of the multi-queue command sets (e.g., 411, 412, 413 and 414) may include a size command and an address command. Thus, in certain embodiments it is assumed that a command set is the same as a corresponding command register entry, but this need not always be the case.

Further assuming the configuration of the command register 325 of FIG. 3, the data size DS1 of the size command in the first multi-queue command set 411 is stored in the data size register 326-1, and the start address SA1 of the address command in the first multi-queue command set 411 is stored in the address register 327-1. Likewise, the data size DS2 of the size command and the start address SA2 of the address command in the second multi-queue command set 412 are stored in the registers 326-1 and 327-2, respectively, and so forth, as illustrated in FIG. 6.

Although not illustrated in FIG. 6 for the sake of clarity, each time a size command and corresponding address command is received from the host 200, the eMMC 300 may communicate a response R1 to the host 200.

The eMMC 300 may now read first data DAT-a from the memory element CE0 of the flash memory 370 according to the data size DS1 and the start address SA1 of the first multi-queue command 411 stored in the registers 326-1 and 327-1 and stores the first data DAT-a in the queue data buffer 345. The eMMC 300 may then read second data DAT-b from the memory element CE1 according to the data size DS2 and the start address SA2 of the second multi-queue command 412 stored in the registers 326-2 and 327-2 and stores the second data DAT-b in the queue data buffer 345, and so forth for each multi-queue command in a serial manner.

Alternatively, in certain embodiments of the inventive concept, the first data DAT-a, second data DAT-b, third data DAT-c, and fourth data DAT-d might be read from the flash memory 370 in parallel.

When the transfer of the current operation data 401 is completed, the host 200 may receive transfer of the data first DAT-a, second DAT-b, third DAT-c, and fourth DAT-d from the queue data buffer 345. For example, the host 200 may transmit a multi-queue data read-out command to the eMMC 300 in order to obtain the data stored in the queue data buffer 345. In response, the eMMC 300 may sequentially transmit the first data DAT-a, second DAT-b, third DAT-c, and fourth DAT-d stored in the queue data buffer 345 to the host 200 in response to a single data read-out command. In other words, the host 200 may obtain all of the data (DAT-a, DAT-b, DAT-c, and DAT-d) stored in a designated queue data buffer 345 in response to only a single multi-queue data read-out command, instead of applying multiple normal data read-out commands respectively associated with the data (DAT-a, DAT-b, DAT-c, and DAT-d).

Figure 7:
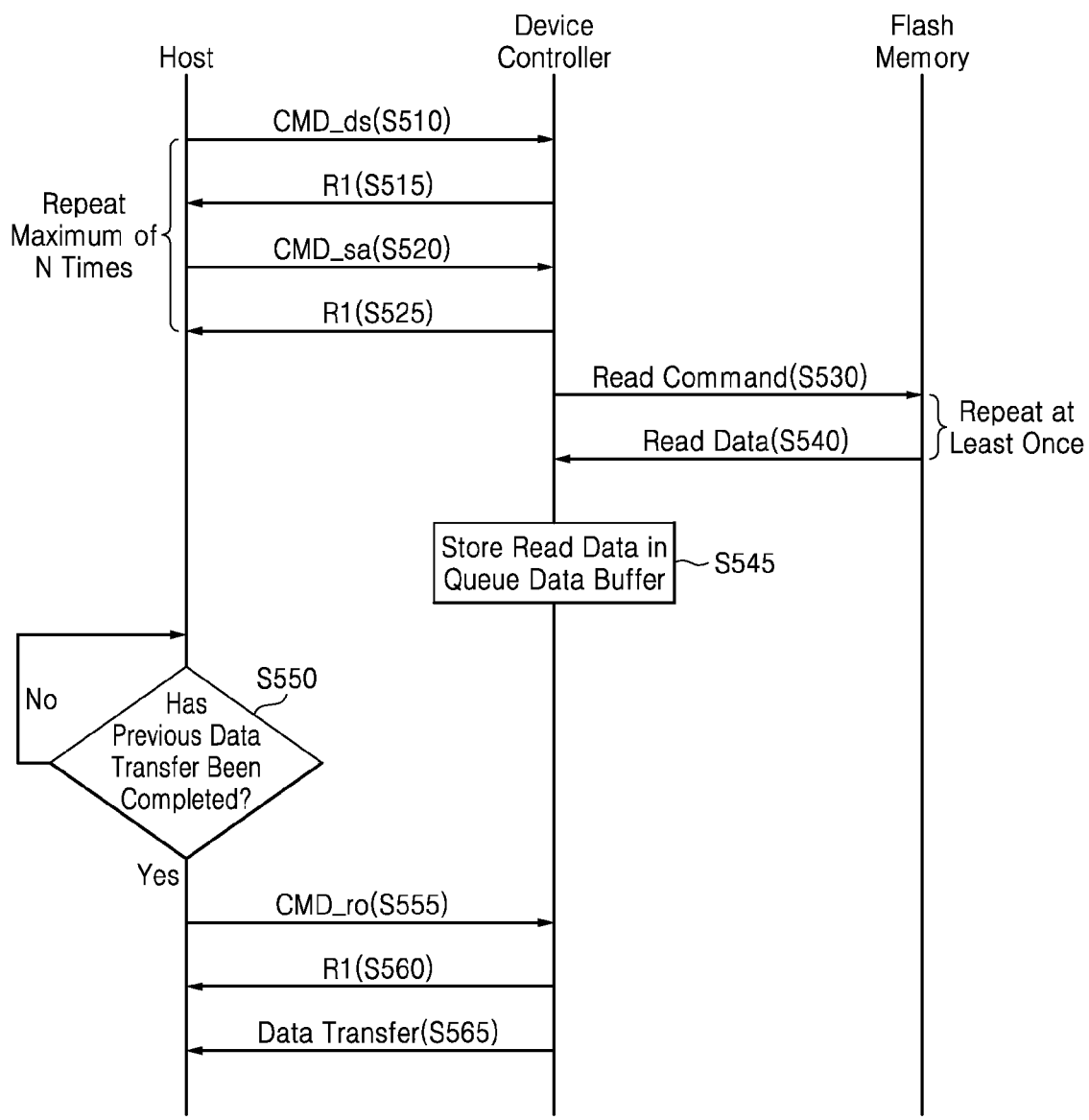
FIG. 7 is an operating diagram that further illustrates in a time-wise manner a multi-queue read operation according to certain embodiments of the inventive concept.

FIG. 7 is an operating diagram that further illustrates in a time-wise manner a multi-queue read operation according to certain embodiments of the inventive concept. To execute a multi-queue read operation, the host 200 transmits a size command CMD_ds that specifies a size for data to be read by the eMMC controller 310 (S510), and the eMMC controller 310 sends a corresponding response R1 back to the host 200 (S515). The eMMC controller 310 then stores the data size value indicated by the size command CMD_ds in a register set.

After receiving the response R1, the host 200 sends an address command CMD_sa to the eMMC controller (S520). The eMMC controller sends a corresponding response R1 to the host (S525) and stores the start address value indicated by the address command CMD_sa in the register set.

The combination (or collectively "an iteration") of operations S5510, S5515, S5520 and S5525 may be repeated as many times allowed by the multi-queue depth N of the command register 325. Multiple iterations may be performed simultaneously with the communication of data associated with e current command via the data bus 103.

The eMMC controller may now send a multi-queue read command to the flash memory 370 indicating at least one data size and at least one corresponding start address stored in the command register 325 (S530). In response, the flash memory 370 will retrieve the read data specified (S540), and load the read data from the flash memory 370 to the queue data buffer 345 (S545).

Once the current command (e.g., a normal read-out command) has been completed (S550=Yes), the host 200 may send a multi-queue read-out command CMD_ro to the eMMC controller 310 (S555), and in response to this single (multi-queue) data read-out command CMD_ro, the eMMC controller 310 may return a response R1 to the host (S560) and then communicate all of the data stored in the queue data buffer (S565) in accordance with the multi-queue read operation.

FIG. 8, inclusive of FIGS. 8A and 8B, is a set of operating diagrams comparing a nominal read operation that may be performed by an eMMC with a multi-queue read operation that may be performed by an eMMC according to embodiments of the inventive concept. FIG. 8A illustrates a nominal or conventionally performed read operation and FIG. 8B illustrates a multi-queue read operation according to an embodiment of the inventive concept.

In the nominal read operation illustrated in FIG. 8A, when a current state is a data transfer state, that is, while data is being transferred through a data bus (610), a host cannot send a command for reading or writing data to a flash memory except for a particular command, e.g., a stop command or an abort command for stopping a previous command. Only after the data transfer 610 is completed, the host can send a normal read command 620 to the eMMC. The eMMC reads data from the flash memory in response to normal data read commands 621 and 623 (tR or 625) and transmits the data to the host (627). While the eMMC is reading the data from the flash memory (625) and transmitting the data to the host (627), the host cannot send a subsequent read command. Therefore, the host must wait for the data to be completely received before sending the read command.

However, referring to FIG. 8B, the host 200 sends a multi-queue read command set 720 to the eMMC 300 even during the transfer of data 710. In detail, the host 200 sends a size command CMD57 or 721 to the eMMC 300 and the eMMC 300 sends to the host 200 a response R1 or 722 to the size command CMD57 or 721. Next, the host 200 sends an address command CMD58 or 723 to the eMMC 300 and the eMMC 300 sends to the host 200 a response R1 or 724 to the address specifying command CMD58 or 723. Here, the size command CMD57 or 721 corresponds to the size command 430 illustrated in FIG. 4B and the address command CMD58 or 723 corresponds to the address command 440 illustrated in FIG. 4C.

The host 200 may send a multi-queue read command set including the commands CMD57 and CMD58 to the eMMC 300 N times. The eMMC 300 reads data from the flash memory 370 in response to the multi-queue read command set 720 and stores the data in the queue data buffer 345. Meanwhile, the data 710 being transferred is stored in the normal buffer 341.

When the transfer of the previous data 710 is completed, the host 200 sends a data read-out command CMD59 or 726 to the eMMC 300 in order to read out data 731 through 733 from the queue data buffer 345. The eMMC 300 sends a response R1 or 726 to the host 200 in response to the data read-out command CMD59 or 726 and transmits the data 731 through 733 stored in the queue data buffer 345 to the host 200 via the data bus 103.

Figure 9:
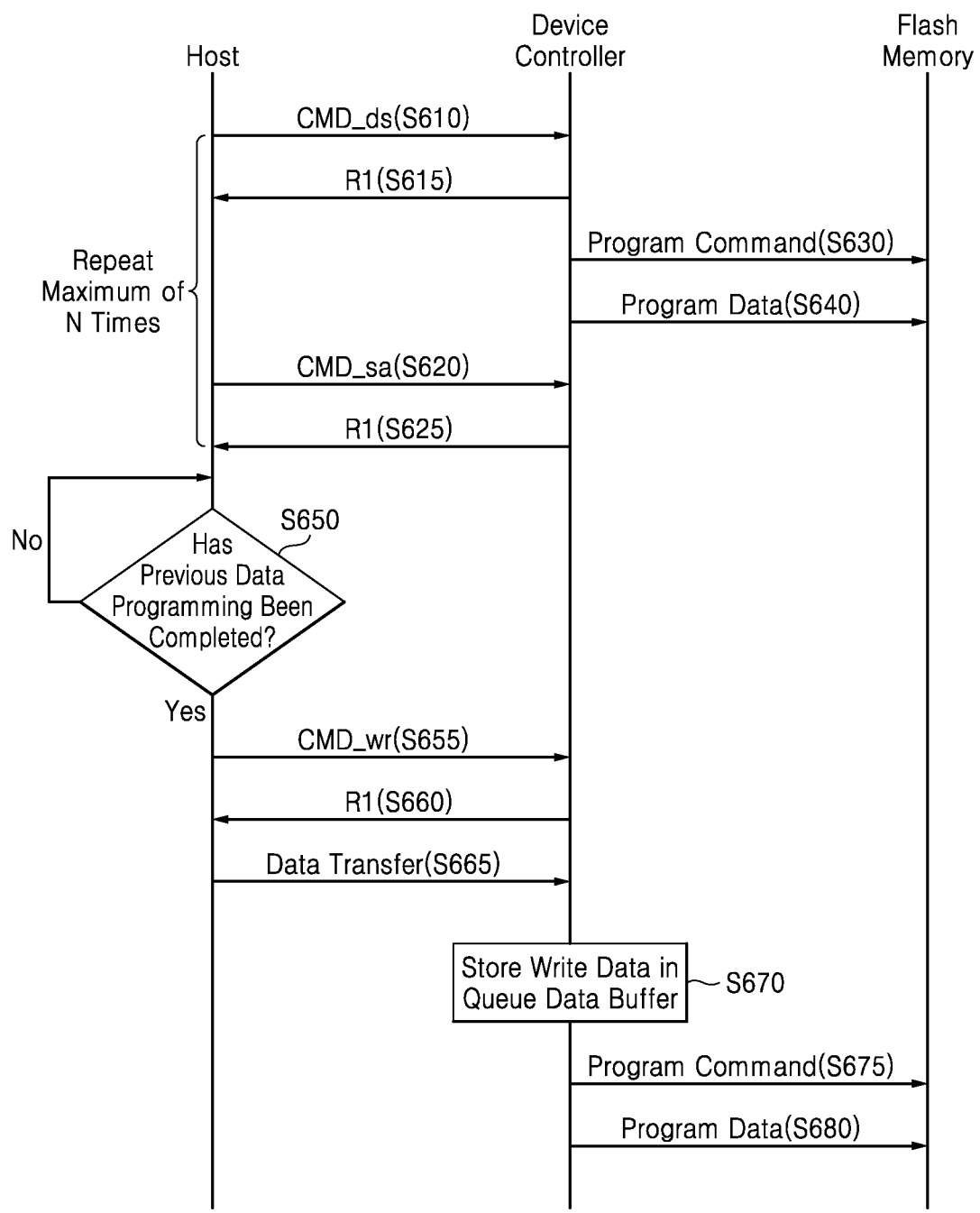
FIG. 9 is an operating diagram that illustrates one possible approach to a multi-queue write operation that may be performed by certain embodiments of the inventive concept.

FIG. 9 is an operating diagram illustrating a multi-queue write operation according to certain embodiments of the inventive concept. Referring to FIGS. 2, 3 and 9, the host 200 transmits a size command CMD_ds specifying the size of data to be written to the eMMC 300 using eMMC controller 310 (S610). The eMMC controller sends a corresponding response R1 to the host 20 (S615), and stores a data size value corresponding to the size command CMD_ds in the command register 325.

The host 200, upon receiving the response R1 to the size command CMD_ds, sends an address command CMD_sa to the eMMC controller 310 (S620), and the eMMC controller 310 sends a corresponding response R1 to the host 200 (S625) and stores the start address value corresponding to the address command CMD_sa in the command register 325.

As before, operations S610, S615, S620 and S625 may be repeated as many times as the maximum multi-queue depth N allows, and may be performed even while data indicated by a current operation is being communicated via the data bus 103. And operations S610, S615, S620 and S625 may be performed even while the eMMC controller 310 is sending the command specifying the current operation to the flash memory 370 (S630) and/or while the flash memory 370 is programming the data associated with the current write command (S640). Thus, the write data associated with a current address may be transferred and/or programmed in the flash memory 370 using the normal buffer 341.

Once the transfer of the current write data is completed (S650=Yes), the host 200 may send a multi-queue data write-in command CMD_wr to the eMMC controller 310 (S655). In response to the multi-queue data write-in command CMD_wr, the eMMC controller 310 sends a corresponding response R1 (S660), and then the host 200 may communicate all of the write data associated with the multi-queue write operation to the eMMC controller 310 (S665).

The eMMC controller 310 will store all of the write data in the queue data buffer 345 (670). The eMMC controller 310 may then communicate a program command to the flash memory 370 that will program the write data stored in the queue data buffer 345 (S675) and then programs the write data to the flash memory (S680).

FIG. 10, inclusive of FIGS. 10A and 108B, is a set of operating diagrams comparing a nominal read operation that may be performed by an eMMC with a multi-queue read operation that may be performed by an eMMC according to embodiments of the inventive concept. FIG. 10A illustrates a nominal or conventional write operation, and FIG. 10B illustrate a multi-queue write operation.

In the nominal write operation illustrated in FIG. 10A, after the completion of the transfer of previous data 811, a host sends to an eMMC data 812 a write command CMD or 821 and data DAT-a or 812 corresponding to the write command CMD or 821. The eMMC programs the data DAT-a or 812 to a flash memory (tPRG1). Only when the data DAT-a or 812 is completely programmed to the flash memory, the transfer of the data DAT-a or 812 is completed. Accordingly, the host stands by until the programming of the data DAT-a is completed and only then sends another write command CMD or 822 and data DAT-b or 813 corresponding to the write command 822 to the eMMC.

However, referring to FIG. 10B, the host 200 sends multi-queue write command sets 841 through 844 to the eMMC 300 even during the transfer of previous data 831. The multi-queue write command sets 841 through 844 may include a size specifying command and an address specifying command, as shown in FIGS. 4A through 4C.

The eMMC 300 stores the multi-queue write command sets 841 through 844 in the command register 325. When the transfer and the programming (tPROG) of the previous data 831 is completed, the host 200 sends to the eMMC 300 a data write-in command CMD or 845 and data DAT-a, DAT-b, DAT-c, and DAT-d corresponding to the data write-in command 845. The eMMC 300 stores the data DAT-a, DAT-b, DAT-c, and DAT-d in the queue data buffer 345 and programs the data DAT-a, DAT-b, DAT-c, and DAT-d stored in the queue data buffer 345 to the flash memory 370.

As described above, according to embodiments of the inventive concept, a host is allowed to send a next read/write command even while data associated with a current command is being transferred, thereby enabling an eMMC to make preparations for the execution of a next read/write command. As a result, the read/write performance of the eMMC is improved.

While the inventive concept has been particularly shown and described with reference to exemplary embodiments thereof, it will be understood by those of ordinary skill in the art that various changes in forms and details may be made therein without departing from the scope of the inventive concept as defined by the following claims.

What is claimed is:

1. An embedded multimedia card (eMMC) comprising:
 flash memory; and
 an eMMC controller that controls operation of the flash memory and comprises:
  a first memory that transfers first data specified by a current operation to a host;
  a command register that receives, from the host and simultaneously with the transfer of the first data, a command set defining a next operation specifying second data; and
  a second memory that stores the second data, wherein:
 the command register has a multi-queue depth of maximum size N and receives and stores the command set including N validated command set entries, where N is an integer greater than one, and
 each of the command set entries comprises a subsequent operation to be executed by the eMMC controller, subsequent to the execution of the current operation, and an address of the flash memory upon which the subsequent operation will be executed.

2. The eMMC of claim 1, wherein the command set is received via a command line, simultaneously with the transfer of the first data via a data bus.

3. The eMMC of claim 2, wherein each of the command set entries comprises:
 a size command specifying a size of data; and
 an address command specifying a start address for the data.

4. The eMMC of claim 3, wherein the next operation is a multi-queue read operation, the size command specifies a size of read data to be retrieved from the flash memory, and the address command specifies a start address for the read data in the flash memory.

5. The eMMC of claim 3, wherein the next operation is a multi-queue write operation, the size command specifies a size of write data to be written to the flash memory, and the address command specifies a start address for the write data in the flash memory.

6. The eMMC of claim 2, wherein the flash memory includes an extended card specific data (CSD) register storing information that indicates the multi-queue depth to the host.

7. The eMMC of claim 2, wherein the flash memory includes an extended card specific data (CSD) register and the eMMC controller additionally includes a host control register separate from the CSD register that stores information indicating the multi-queue depth to the host.

8. The eMMC of claim 1, wherein the first memory and the second memory are separately provided by separate memory devices.

9. A method of operating an embedded multimedia card (eMMC) including flash memory, the eMMC being connected to a host via a command line and a data bus, the method executed by an eMMC controller and comprising:
 transferring first data stored in a first memory of the eMMC to the host via the data bus in response to a current operation; and
 simultaneously with the transfer of the first data, communicating a command set defining a next operation specifying second data from the host to the eMMC via the command line and storing the command set in a command register in the eMMC, wherein:
 the command register has a multi-queue depth of maximum size N and receives and stores the command set including N validated command set entries, where N is an integer greater than one, and
 each of the command set entries comprises a subsequent operation to be executed by the eMMC controller, subsequent to the execution of the current operation, and an address of the flash memory upon which the subsequent operation will be executed.

10. The method of claim 9, wherein the next operation is a multi-queue read operation and the second data is read data temporarily stored in a second memory of the eMMC separately designated from the first memory.

11. The method of claim 10, further comprising:
 communicating a data read-out command from the host to the eMMC via the command line; and
 in response to the data read-out command and upon following transfer of the first data, transferring all of the second data stored in the second memory to the host.

12. The method of claim 9, wherein each of the command set entries comprises:
 a size command specifying a size of data; and
 an address command specifying a start address for the data.

13. The method of claim 12, wherein the next operation is a multi-queue read operation, the size command specifies a size of read data to be retrieved from the flash memory, and the address command specifies a start address for the read data in the flash memory.

14. The method of claim 9, wherein the flash memory includes an extended card specific data (CSD) register storing information that indicates the multi-queue depth to the host, and the method further comprises:
  receiving a SEND_EXT_CSD command from the host in the eMMC; and
  transferring data in the extended card specific data (CSD) register to the host in response to the SEND_EXT_CSD command.

* * * * *